United States Patent [19]

Naruo et al.

[11] Patent Number: 4,876,007
[45] Date of Patent: Oct. 24, 1989

[54] PLATE-TYPE FILTER CARTRIDGE WITH INTERNAL SUPPORT

[75] Inventors: Kyoichi Naruo; Sumio Ohtani; Masahiro Etoh; Masao Tsuruta; Ikuro Moriya; Masanori Ishiguro; Akira Matsumoto, all of Kanagawa, Japan

[73] Assignee: Fuji Photo Film Co., Ltd., Kanagawa, Japan

[21] Appl. No.: 90,474

[22] Filed: Aug. 28, 1987

[30] Foreign Application Priority Data

Aug. 28, 1986 [JP] Japan .................................. 61-200179
Sep. 17, 1986 [JP] Japan .................................. 61-217302
Sep. 17, 1986 [JP] Japan .................................. 61-217304

[51] Int. Cl.$^4$ .............................................. B01D 29/34
[52] U.S. Cl. ...................................... 210/339; 210/346; 210/486; 210/488; 210/497.2; 55/492
[58] Field of Search ............... 210/314, 317, 331, 339, 210/346, 347, 486, 487, 488, 497.2; 156/423, 434; 55/492; 264/DIG. 48

[56] References Cited

U.S. PATENT DOCUMENTS

| 2,630,228 | 3/1953 | Wright et al. | 210/346 |
| 3,262,577 | 7/1966 | Tuit | 210/347 |
| 3,294,241 | 12/1966 | Sicard et al. | 210/347 |
| 3,486,627 | 12/1969 | Ashley et al. | 210/486 |
| 3,542,205 | 11/1970 | O'Cheskey | 210/347 |
| 3,737,036 | 6/1973 | Kasten | 210/486 |
| 4,221,663 | 9/1980 | Little | 210/486 |
| 4,637,876 | 1/1987 | Dosoudil | 210/346 |
| 4,704,207 | 11/1987 | Chu | 210/347 |

FOREIGN PATENT DOCUMENTS 129016 8/1981 Japan .

Primary Examiner—Richard V. Fisher
Assistant Examiner—Wanda L. Millard
Attorney, Agent, or Firm—Sughrue, Mion, Zinn, Macpeak & Seas

[57] ABSTRACT

A plate-type filter cartridge includes a plurality of stacked filtration units; each filtration unit having inner and outer rims, two filtration membranes bonded to opposite sides of the two rims, and a pair of netty members formed of fibrous material contacting a porous support and membranes. The support supports the membrane and is disposed between the membranes; the support being defined by a plurality of spokes and an outer rim.

7 Claims, 3 Drawing Sheets

PLATE-TYPE FILTER CARTRIDGE WITH INTERNAL SUPPORT

BACKGROUND OF THE INVENTION

1. Field of the Invention

The present invention relates to a filter cartridge including microporous filtration membranes. Particularly, it relates to a structure of a filter cartridge used for accurately filtering out fine particles and microorganisms of the order of 10 μm or less, especially 1 μm or less, such as filtration of refined or purified water for producing wash water used in the process of filtrating or producing medicines in the industrial pharmaceutical field, filtration of refined or purified water for producing hyperpure water used for fine processing in the field of electronics industry such as semiconductor manufacturing, or used in the process of producing alcohol drinks in the field of food industry, and other types of accurate filtration.

2. Background of the Invention

Heretofore, there has been widely used a pleat-type filter cartridge having a microporous filtration membrane. This filter cartridge is formed in such a manner that the microporous filtration membrane is creased so as to be shaped like pleats. A cylindrical filtration membrane structure having a height in the direction of the pleats is disposed in a parallel arrangement. The inside and outside of the cylindrical filtration membrane structure are protected by plastic members. Other plastic members are stuck to the ends of the cylindrical filtration membrane structure to be sealed to the membrane structure. The pleat-type filter cartridge has an advantage in that the area of the filtration membrane within a unit volume (effective filtration area) can be increased to thereby attain an enormous filtration flow rate per unit time. Therefore, the pleat-type filter cartridge is useful for large-scale filtration in the field of the aforementioned industries or in laboratories.

The filter must be installed in a housing for dedicated use. Recently, in order to save the trouble of installing the filter or for the purpose of small-scale filtration, a disposable filter cartridge (or so-called capsule-type cartridge) having an effective filtration area of 0.05 to 0.4 m² is formed by uniting the filtration membrane structure and the housing to one body. This disposable filter cartridge has been used as one filtration means for a filtration line in which the filter must be frequently replaced in a short time after filtering various kinds of liquid. On the other hand, a so-called minifilter cartridge having a small effective filtration area and installed in a metal housing has been used for the purpose of small-scale filtration. The minifilter cartridge has a filtration membrane structure including a seal portion to be installed in the housing, but the filtration portion of the minifilter cartridge is substantially the same as that of the disposable filter cartridge. Both the disposable filter cartridge and the minifilter cartridge are generally classified into two types, viz., a pleat-type filter cartridge and a stratified plate-type filter cartridge formed by piling up plate-type filtration units, as disclosed in Japanese Patent Unexamined Publication No. 129016/1981. The structure and manufacturing method of both the disposable filter cartridge and the minifilter cartridge of the pleat type are substantially the same as those of the aforementioned pleat-type filter cartridge installed in the housing for dedicated use. In the case of the pleat-type disposable filter cartridge, the process of inserting the filtration membrane structure into the plastic housing is required after preparation of the filtration membrane structure. The structure and manufacturing method of the stratified plate-type filter cartridge in both the disposable filter cartridge and the minifilter cartridge are substantially as follows, as described in the Japanese Patent Unexamined Publication No. 129016/1981.

Two filtration membranes prepared by punching out the outer and center portions so as to be respectively shaped like a circle or a polygon are stuck to a platelike support having parallel planes. In the case of circle, each of the membranes is shaped like a doughnut. According to circumstances, the support is formed by sticking two plastic members together at the outer circumferential edge portions and inner circumferential edge portions or at other predetermined positions if necessary. Particularly, the outer circumferential edge portions and inner circumferential edge portions must be liquid-tightly sealed by sticking. Generally, the platelike support is so designed that the flow path of filtered liquid is established by an inside space formed by sticking the two filtration membranes to both the sides of the support. In other words, the plate-like support forms a diaphysis structure having a center opening for out flow of filtrate at the inner circumferential edge portion of the support to thereby make it possible that the two filtration membranes can be held from the inside and that filtrated liquid can suitably flow out to the center portion of the plate-type filtration unit.

Further, a plurality of plate-type filtration units are stuck to each other by applying an adhesive to the center portions of the plate-type filtration units to prepare a filtration membrane structure stratified in the direction of thickness of the units. In order to protect the filtration membranes, an upper protective plate is mounted onto the upper portion of the stratified structure with a predetermined distance between the upper protective plate and the filtration membrane of the uppermost plate-like filtration unit. Similarly, a lower protective plate is mounted onto the lower portion of the stratified structure for the same purpose as described above. In the case of the minifilter cartridge, the lower protective plate serves also for the purpose of securing the setting of the housing. The thus prepared stratified filtration membrane structure is stuck to the housing to produce a disposable filter cartridge.

In the case of production of a minifilter cartridge, a seal portion having a slot for insertion of a sealing material, such as an O-ring or the like, to be set in the housing is provided in the stratified filtration membrane structure. The properties which are desired of the disposable filter cartridge and the minifilter cartridge are, for example, increasing the filtration area per unit volume, that is, providing a compact module of filtration, reducing filtration pressure, improving filtration accuracy, simplifying interchange of the filter cartridge into the filtration line, preventing the microporous membrane from being injured due to abrasion and impact in handling, reducing filtration cost, reducing the residual quantity of liquid, and the like.

However, the conventional plate-type filtration unit, for example, as disclosed in the Japanese Patent Unexamined Publication No. 129016/1981, has the structure in which the plate-like support has a large number of coaxial ribs, channels, and the like, and in which the filtration membrane is stuck to the ribs. If the filtration membrane is elastic, it expands to the primary side of filtration so as to be stretched when pressure from the secondary side acts on it for the purpose of backwashing or the like. In an extreme case, the filtration membrane is peeled from the support. As a measure to counter this, there may be provided means for increasing the area where the filtration membrane is stuck to the support. However, the portion where the filtration membrane is stuck to the ribs cannot function as a filtration membrane. There arises a problem in that the effective filtration area becomes relatively small compared to the whole area of the filtration membrane because the portion not functioning as a filtration membrane has a large area. Further, the structure in which the filtration membranes are stuck at a large number of places to both the sides of the plate-like support often causes distortion of the filtration membranes. Hence it becomes difficult to secure tightness at each of the outer circumferential edge portion and the inner circumferential edge portion between the respective filtration membrane and the plate-like support. Further, in the case where the structure is so compact as that of the present invention, the structure is difficult to produce and various processes are required. Hence, not only a problem exists in cost but also a problem arises in reliability of tightness and the like. Further, if the structure of the plate-like support, especially the structure of the liquid flow path composed of a large number of ribs, channels and the like, is so complex as disclosed in the Japanese Patent Unexamined Publication No. 219016/1981, the filtration resistance becomes large. Hence, not only a problem exists in that the liquid does not flow well, but also a problem exists in the escape of air and of residual liquid. In addition, the manufacturing cost and assembling cost of the plate-type support are both great.

Further, in the case where the plate-type filtration units are stuck to each other at their center portions so as to be piled up, adjacent filtration membranes often come into contact with each other if the filtration membranes are inclined. There exists the defect that the volume of the filter cartridge is increased as the distance between adjacent filtration units is increased to avoid such contact.

SUMMARY OF THE INVENTION

An object of the present invention is therefore to eliminate the aforementioned problems in the prior art.

Specifically, an object of the invention is to provide a low-cost filter cartridge having a filtration membrane structure which is simple in construction, a large effective area for the filtration membrane, and has excellent liquid-tightness as well as good workability.

In order to attain the foregoing objects, according to an aspect of the present invention, the plate-type filter cartridge comprises one filtration unit or a plurality of filtration units piled up, the filtration unit being constituted by a pair of inner and outer rims. A pair of upper and lower filtration membranes are disposed in parallel to each other, each having inner and outer circumferential edge portions stuck to the inner and outer rims respectively. A porous membrane support selected from paper, nonwoven fabric and netty material is interposed between the pair of upper and lower filtration membranes.

According to another aspect of the present invention, the plate-type filter cartridge comprises one filtration unit or a plurality of stacked filtration units. The filtration unit is constituted by a pair of inner and outer rims, a pair of upper and lower filtration membranes bonded only to the inner and outer rims, and a porous membrane support selected from paper, nonwoven fabric and netty material and disposed within a primary space of the membranes.

According to a further aspect of the present invention, the stratified plate-type filter cartridge comprises a plate-type filtration unit constituted by a support, a pair of filtration membranes disposed at upper and lower portions of the support, and a pair of netty members provided respectively between the support and one of the filtration membranes and between the support and the other one of the filtration membranes so as to hold the filtration membranes.

DETAILED DESCRIPTION OF THE INVENTION

Figure 1:
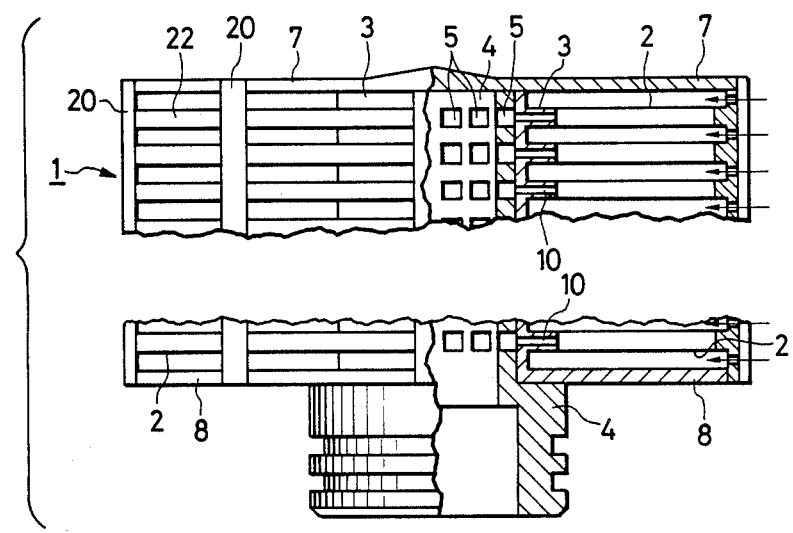
FIG. 1 is a partly broken side view showing one embodiment of the present invention.

FIG. 1 shows one embodiment of the present invention.

Referring to FIG. 1 there is shown a filtration membrane structure 1 which is formed by piling up a plurality of plate-type filtration units. Each filtration unit is, for example, composed of a pair of upper and lower disk-like filtration membranes 2 as the smallest unit of filtration. A cylindrical core 4 having through holes 5 communicated with central openings 10 of the respective plate-type filtration units, is provided at the center of the filtration membrane structure 1. An upper protective plate 7 and a lower protective plate 8 for protecting the filter membranes 2 are provided at the upper and lower portions of the piled plate-like filtration units. Outer ribs 20 along the direction of unit thickness are disposed circumferentionally at regular intervals with gaps therebetween to hold the filtration units between the upper and lower protective plates 7 and 8. The outer ribs 20 may be prepared separately from the respective units or may be prepared as projections provided on outer rims 6 of the respective units so that the outer ribs 20 can be formed when the respective units are piled up.

Figure 2:
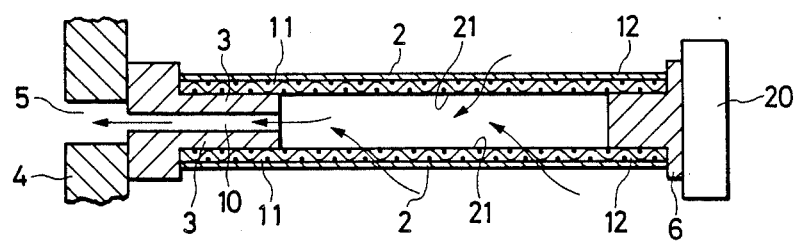
FIG. 2 is a partly enlarged sectional view showing the filtration unit depicted in FIG. 1.
Figure 3:
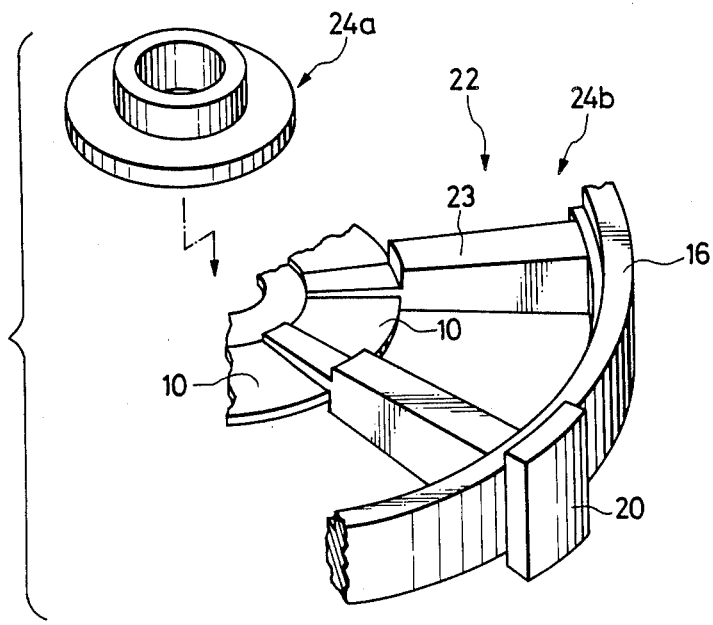
FIG. 3 is a partly exploded perspective view of a support of the filtration membranes in one embodiment.
Figure 4:
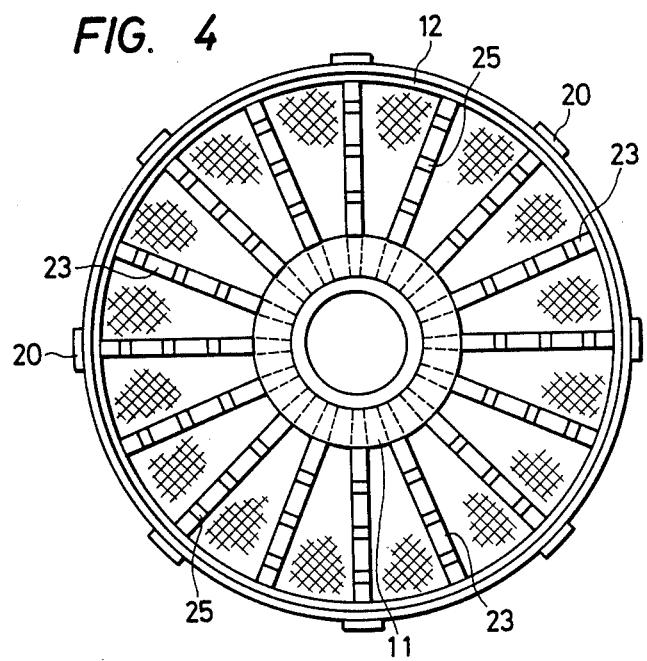
FIG. 4 is a schematic plan view of a plate-type filtration unit according to the present invention.

One plate-type filtration unit as the smallest unit of the filtration membrane structure 1 has, as shown in FIGS. 2 to 4, a pair of filtration membranes 2 respectively held by netty members 21 in the upper and lower side of a support 22. For example, the support 22 is composed of an inner rim 3 disposed at the center, an outer rim 6 disposed at the circumference, and a plurality of spokes 23 for connecting the inner and outer rims 3 and 6 to each other. The support 22 may be formed as one body for example by extrusion molding or the like. On the other hand, as shown in FIG. 3, a small-diameter circular member 24a shaped like a double-stage cylinder and having part of the inner rim 3 may be combined with a large-diameter circular member 24b having spokes 23 and the outer rim 6 to thereby form a central opening 10 (refer to FIG. 2).

The pair of netty members 21 and the pair of filtration membranes 2 are respectively stuck to the upper lower portions of the aforementioned support 22 to thereby prepare one plate-type filtration unit. The filtration membranes 2 and the support 22 are stuck to each other at the locations of the inner and outer rims 3 and 6. In other words, the inner circumferential edge portions 11 and the outer circumferential edge portions 12 of the filtration membranes 2 are stuck over their entire circumferential areas to the support 22. Accordingly, the liquid-tightness between the liquid before filtration (at the primary side) and the liquid after filtration (at the secondary side) can be kept. As described above, the whole area of the filtration membrane 2 is held by the netty member 21 so that the filtration membrane 2 can tolerate filtration pressure without having to be partially stuck/supported throughout almost the whole area as in the prior art. Consequently, the effective filtration area can be increased.

Although this embodiment has shown the case where only the inner and outer circumferential edge portions 11 and 12 of the filtration membranes 2 and netty member 21 are stuck to the support 22, it is to be understood that the present invention is not limited to the specific embodiment but the filtration membranes 2 may have a plurality of spot-adhesive portions 25 at the filtration area together with the inner and outer circumferential edge portions. In other words, the spot-adhesive portions 25 are at the least portions where the membranes 2 and the netty members 21 are stuck at very small areas. Further, to provide for the strength of the filtration membranes 2, it is preferable that the spot adhesive portions 25 are respectively located on the spokes 23 of the support 22 and also stuck to the spokes 23.

By provision of the spot adhesive portions 25, the reinforcement of the filtration membranes 2 becomes more secure and durability against filtration pressure is further improved. Further, for example, when the filtration membranes are cleansed by liquid pressure in the reverse direction to the filtration pressure, durability against reverse pressure is improved so that the cleansing operation can be easily and securely made.

Further, the adhesive area of the spot-adhesive portions 25 is so very small that the reduction of effective filtration area can be minimized.

The plurality of plate-type filtration units constructed as described above are piled up around the core 4 centered in the filter cartridge. Accordingly, the core 4 is fitted to the inner diameter portion of the inner rim 3 so that the filter cartridge can be easily assembled with a suitable adhesive agent while keeping liquid-tightness. Accordingly, the filter cartridge according to the present invention is quite different from the prior art type filter cartridge in that the core 4 in the present invention forms a central liquid path by itself. On the other hand, the filtration membrane structure must be formed while forming a central cylindrical liquid path by sticking and piling up the plate-type filtration units to one another in the prior art. Further, not only the filtration units are stuck to one another at the inner rims but also the inner surfaces of the inner rims 3 are stuck to the outer rims 6. Accordingly the adhesive 3 area can be increased to make it easy to secure highly-accurate sealing. Further, the provision of the core 4 can improve the centering, the assembling property, and the stiffness of the filtration membrane structure.

It is a matter of course that the lower side of the core 4 is connected to a housing (not shown) while keeping the liquid-tightness in the same manner as in the prior art.

The material used for the support 22, the upper and lower protective plates 7 and 8, the core 4, the netty members 21 and the like in the present invention is not limited specifically, but plastic resin is suited to the material in view of workability. Particularly, inactive resin having proper stiffness can be suitably selected. Typical examples of the inactive resin include polyester, polycarbonate, polysulfone, polyvinylidene fluoride, polyoxymethylene resin, polyamide, phenyl-formaldehyde resin, fluorine resin such as polytetrafluorethylene tetrafluoroethylene/perfluoralkyl vinyl ether copolymer and the like, polychlorotrifluoroethylene, polypropylene, polyethylene and the like.

The filtration membrane 2 is formed of material selected from, for example, Nylon, polysulfone, polyvinylididene fluoride, triacetyl a cellulose, polytetrafluorethylene, and the like.

The path of filtrate in the filter cartridge having the aforementioned filtration membrane structure 1 is as shown by the arrows of FIG. 2. The filtrate flowing in the housing (not shown) permeates the filtration membranes 2 by proper liquid pressure at the outside (primary side) of the filtration membranes sealed at the inner and outer circumferences so that impurities, such as fine particles, microorganisms and the like, are filtered out on all the area of the filtration membranes 2 except the inner circumferential edge portions 11, the outer circumferential edge portions 12 and the spot adhesive portions 25. After filtration, the filtrate enters the inside (secondary side) of the filtration membranes 2 and then passes through the plurality of center openings 10 formed in the inner rim 3. Successively, the filtrate passes through the hollow portion of the core 4 from through holes 5 communicating with the center openings 10 so that the filtrate is taken out of the filter cartridge. Thus, a necessary filtration process is accomplished.

As described above, the filtration membranes 2 show the filtration function over almost the whole area except the inner circumferential edge portions 11 stuck to the inner rims 3 and the outer circumferential edge portions 12. Accordingly, the filtration unit according to the present invention can have a large filtration area and can act in the condition of low filtration pressure because the filtration membranes have only a small portion adhered supported as a whole, compared to the conventional plate-type filtration unit. In the conventional filtration unit, the filtration membranes are stuck to a support having a large number of ribs or channels fragmentarily disposed on the almost whole area of the filtration membranes. Further, the whole area of the filtration membrane 2 is held by the netty member 21, so that the filtration membrane 2 can have durability against filtration pressure even in the case the filtration membrane is formed of relatively weak material. Furthermore, the shape of the support 22 is suitable for forming a very simplified liquid path compared to that of the prior art. Accordingly, not only the smooth flow of filtrate can be attained but also the residual quantity of filtrate at the last stage of the filtration process can be reduced. For example, air or residual liquid can easily escape. Moreover, as described above, the filtration membranes 2 and the netty members 21 are stuck to the spoke 23 of the support 22 by spot adhering. Accordingly, not only the strength of the filtration membrane can be improved but also the filtration membranes can sufficiently tolerate reverse pressure even in the case where the reverse pressure is increased for the purpose of cleaning the filtration membrane structure 1.

In this embodiment, the outer ribs 20 are provided to support the outer circumference of the filtration membrane 2 to thereby limit the position of the filtration membranes 2, keep the unit intervals constant and improve the handling of the filtration membrane structure 1. However, the outer ribs 20 need not always be provided.

Further, a porous membrane support 14 may be interposed between a pair of filtration membranes or provided in the outside of a pair of filtration membranes. Further, the porous membrane support 14 may be provided between and on the outside of the pair of filtration membranes, simultaneously.

Figure 5:
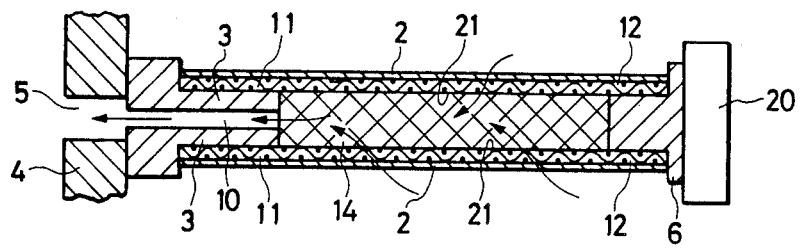
FIGS. 5 is a partly enlarged sectional view showing the filtration unit according to another embodiment.

FIG. 5 shows another embodiment of the present invention.

One plate-type filtration unit as the smallest unit of the filtration membrane structure 1 has, as shown in FIG. 5, a pair of filtration membranes 2 respectively held by netty members 21 on the upper and lower side of a support 22 in the same manner as the above-described embodiment. In this embodiment, a porous membrane support 14 formed of paper, nonwoven fabric or netty material is interposed between the pair of upper and lower filtration membranes 2. The outer circumferential edge portions 12 of the filtration membranes are stuck to the outer rim 6 throughout the circumference of the filtration membrane unit so that the filtration membranes 2 are sealed. The overlap width (margin to paste up in the direction of radius) in the inner circumferential edge portions 11 and in the outer circumferential edge portions 12 are not limited specifically, but it is preferable that the overlap width is determined in consideration for liquid-tightness, reduction of effective filtration area due to sticking, and so on. In this embodiment, the range of 0.1 to 5 mm is suitable for the overlap width.

The membrane support 14 formed of paper, nonwoven fabric or netty material is provided to support the pair of, upper and lower, filtration membranes 2 from the inside but is not stuck thereto. Accordingly, the filtration membranes can be increased in effective filtration area and can bear up against relatively high filtration pressure. Furthermore, the process of assembling the filtration units can be simplified.

It is a matter of course that the membrane support 14 may be stuck to the inner and outer rims 3 and 6.

In the present invention, a membrane support 14 formed of paper, nonwoven fabric or netty material is interposed between the pair of upper and lower filtration membranes 2. The nonwoven fabric or netty material is not limited specifically, but it is preferable that polyester or polypropylene is used as the material and a long-staple fiber is used for preparing the material. In this viewpoint, a span-bond production method is used in the present invention. Further, it is preferable that the membrane support of nonwoven fabric or netty material is not stuck to the filtration membranes.

Although means of sealing and supporting the outer circumferential edge portions of the filtration membrane have been described, it is to be understood that the invention is not limited to the means described above but any means can be used. For example, the upper and lower membranes 2 may be stuck to each other at the outer circumferential edge portions 12 of the filtration membranes. Further, the form of the outer rim to which the outer circumferential edge portions are stuck can be suitably determined and the means of supporting the outer rim in the filtration unit can be suitably determined as long as the effective filtration area of the filtration membranes is not reduced greatly.

The path of filtrate in the filter cartridge having the aforementioned filtration membrane structure 1 is as shown by the arrows of FIG. 5. The filtrate flowing in the housing (not shown) permeates the filtration membranes 2 from the outside (primary side) of the closed filtration membranes 2 by proper liquid pressure so that impurities, such as fine particles, micro-organisms and the like, are filtered over all the area of the filtration membranes 2 except the inner circumferential edge portions 11 and outer circumferential edge portions 12. After filtration, the filtrate enters into the inside (secondary side) of the filtration membranes 2 and then passes through a plurality of center openings 10 formed in the inner rim 3. Successively the filtrate passes through a hollow portion of the core 4 from the through holes 5 connected with the center openings 10 so that the filtrate is taken out of the cartridge. Thus, the required filtration process is accomplished.

As described above, the filtration membranes 2 show the filtration function on all the area except the inner circumferential edge portions 11 and outer circumferential edge portions 12. Accordingly, the filtration unit according to the present invention can have a large filtration area and can act in the condition of low filtration pressure because the filtration membranes have only a small portion adhered or supported as a whole, compared to the conventional plate-type filtration unit in which the filtration membranes are stuck to a support having a large number of ribs or channels fragmentarily disposed on almost the entire area of the filtration membranes. Further, the filtration unit according to this invention has no conventional type support for holding the filtration membranes from the inside to complicate the path of filtrate. Accordingly, not only the smooth flow of filtrate can be attained but also the residual quantity of filtrate at the last state of the filtration process can be reduced. For example, air or residual liquid can easily escape.

Figure 6:
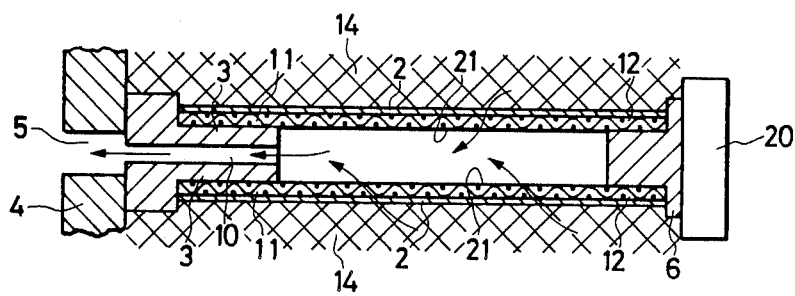
FIG. 6 is a partly enlarged sectional view showing the filtration unit according to a further embodiment.

FIG. 6 shows a further embodiment of the present invention. In FIG. 6, a porous membrane support 14 formed of paper, nonwoven fabric or netty material is inserted in the primary space of the upper and lower filtration membranes 2.

The words "primary space" is defined as a space within the filter cartridge before filtrate passes through the filtration membranes.

Although this embodiment has shown the case where the pair of upper and lower filtration membranes of one filtration unit in the plate-type filter cartridge are disposed in parallel, the invention is not limited thereto. Further, the invention is applicable to the case where the primary space of the filtration unit is an inner space surrounded by the pair of filtration membranes or the case where the primary space is an outer space.

Further, the invention is applicable to the filter cartridge having a spoke portion in the secondary space to connect the inner and outer rims 3 and 6 between the pair of filtration membranes or the filter cartridge having paper, nonwoven fabric or netty inserted in the secondary space.

If necessary, the filtration membrane may be reinforced by spot adhering of netty material formed of synthetic resin. In this case, it is preferable that polyester or polypropylene is used as the synthetic resin netty material for supporting the filtration membrane. Further, any netty structure such as a four-cornered mesh structure, a six-cornered mesh structure or an eight-cornered mesh structure can be used.

With respect to the nowwoven fabric or netty material used the present invention, it is preferable that polyester or polypropylene is used for this material and be formed from long-staple firm fiber by the span-bond production method.

In this embodiment, the filtration membranes can be easily stuck to the filtration unit by any suitable adhesive method. Examples of the adhesive method include a method using a solvent type adhesive agent, a method using an adhesive agent cross-linked by heat, a heat-seal method and the like. Accordingly, the process of sealing the pair of, upper and lower, filtration membranes 2 is very simple, so that reliable liquid-tightness can be secured.

It is a matter of course that the lower side of the core 4 is connected to a housing (not shown) while keeping liquid tightness in the same manner as that of the prior art.

The path of filtrate in the filter cartridge having the aforementioned filtration membrane structure 1 is as shown by the arrows of FIG. 6. The filtrate flowing in the housing (not shown) passes through the nonwoven fabric or netty material 14 in the outside (primary space) of the pair of sealed filtration membranes 2 from filtrate entrances 16 of the filtration unit, and then permeates the filtration membranes 2 by proper liquid pressure. As a result, impurities, such as fine particles, microorganisms and the like, are filtered out over all the area of the filtration membranes 2 except the inner circumferential edge portions 11 and outer circumferential edge portions 12. After filtration, the filtrate enters into the inside (secondary space) of the filtration membranes 2 and then passes through the plurality of center openings 10 formed in the inner rim 3. Successively, the filtrate passes through the hollow portion of the core 4 from the through holes 5 communicated with the center openings 10, so that the filtrate is taken out of the cartridge. Thus, the required filtration process is accomplished.

As described above, the filtration membranes 2 demonstrate the filtration function on all the area except the portions stuck to the inner and outer rims 6. Accordingly, the filtration unit according to the present invention can have a large filtration area and can act in the condition of low filtration pressure because the filtration membrane as have only a small portion adhered and or supported as a whole, compared to the conventional plate-type filtration unit in which the filtration membranes are stuck to a support having a large number of ribs or channels fragmentarily disposed on the almost whole area of the filtration membranes.

In this embodiment, paper, nonwoven fabric or netty material is inserted into the primary space, so that the filtration membranes can tolerate rate reverse pressure produced when the filter cartridge is cleansed or when the liquid-feed pump is stopped. The defect in the prior art is that the effective filtration area is greatly reduced because a large part of filtration membrane is stuck to the rib for support in the filtration unit so as to be able to tolerate reverse pressure. In this embodiment, however, the paper nonwoven fabric or netty material inserted into the primary space has the function of supporting the filtration membranes against reverse pressure to thereby eliminate the defect in the prior art.

Figure 7:
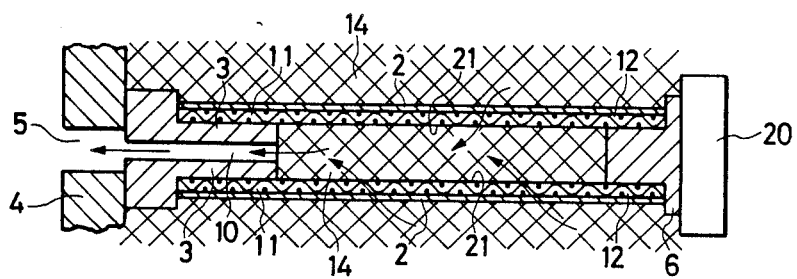
FIG. 7 is a partly enlarged sectional view showing the filtration unit according to a still further embodiment.

FIG. 7 shows a still further embodiment of the present invention. The principal structure shown in FIG. 7 is the same as the above-mentioned embodiments. In FIG. 7, porous membrane supports 14 formed of paper, nonwoven fabric or netty material is not only interposed between the pair of upper and lower filtration membranes 2, but also inserted in the primary space of the upper and lower filtration membranes 2. The embodiment shown in FIG. 7 can obtain the same effects as the above-mentioned embodiments.

The described invention provides a plate-type filter cartridge substantially comprising one filtration unit or a plurality of filtration units piled up, in which each of the filtration units has a pair of parallel upper and lower membranes. A membrane support of paper, nonwoven fabric or netty material is interposed between the pair of upper and lower filtration membranes without being stuck to the filtration membranes. Accordingly, the effective area of the filtration membranes can be increased to thereby make it possible to elongate the filtration lifetime and reduce the filtration pressure.

The filtration membrane unit in accordance with the present invention is simple in structure. Accordingly, the invention can provide a stratified plate-type filter cartridge excellent in liquid-tightness, and reduced in size, in weight as well as in cost.

According to another aspect of the invention, the invention provides a plate-type filter cartridge substantially comprising one filtration unit or a plurality of filtration units piled up, in which each of the filtration units has a pair of upper and lower filtration membranes. A pair of membrane supports of paper, nonwoven fabric or netty material are disposed in upper and lower primary spaces of the filtration membranes partly stuck only at inner and outer rim portions to thereby increase the effective area of the filtration membranes. Accordingly, pressure durability against backwash at cleansing is improved to thereby make it possible to more remarkably elongate the filtration life time and reduce the filtration cost.

According to a still further aspect of the invention, the invention provides a filter cartridge in which filtration membranes are held by netty members to thereby improve the strength of the filtration membranes effectively. Accordingly, the conventional process of sticking the filtration membranes fragmentally to a support which is complicated in construction is unnecessary. Accordingly, with respect to blockage or the like, the filtration life time can be elongated and the filtration pressure can be reduced. Furthermore, the durability against pressure can be improved to thereby make the filtration process efficiently and speedily. Further, the plate-type filtration units can be assembled so as to be fitted to the core to thereby make it possible to provide a filtration membrane structure of high reliability in liquid-tightness as well as in stiffness. Further, because the support is simple in construction, the plate-type filtration unit in accordance with the present invention has various effects, for example, in that the flow path of filtrate can be simplified and that air, residual liquid and the like can easily escape.

Consequently, the present invention can provide a stratified plate-type filter cartridge easy to assemble, excellent in filtration efficiently due to its large effective filtration area and small filtration pressure, excellent in liquid-tightness, improved in size and weight reduced in cost, and suited to accurate filtration.

What is claimed is:

1. A plate-type filter cartridge comprising at least one plate-type filtration unit, said filtration unit comprising:
    an internal support;
    a pair of filtration membranes disposed at upper and lower portions of said internal support such that said internal support extends in between said pair of filtration membranes; and
    a pair of first netty members formed from fibrous material provided respectively between and contacting said internal support and respective ones of said filtration membranes for holding said filtration membranes to thus form said filtration unit, wherein said internal support comprises a central cylindrical member, an outer rim and a plurality of spokes integral with said cylindrical member and said outer rim and extending in the radial direction of said filtration unit between said cylindrical member and said outer rim.

2. A plate type-filter cartridge as claimed in claim 1, in which said filtration membranes and said pair of first netty members are stuck to said support by spot adhering.

3. A plate-type filter cartridge as claimed in claim 1, further comprising a core provided separately from said filtration unit and disposed in the center of said cartridge for supporting said filtration unit.

4. A plate-type filter cartridge as claimed in claim 1, in which said filtration unit further comprises a second netty member of fibrous material provided between said pair of filtration membranes.

5. A plate-type filter cartridge as claimed in claim 4, in which said second netty member is further provided on both outer sides of said pair of filtration membranes.

6. A plate-type filter cartridge as claimed in claim 1, in which said filtration unit further comprises second netty members provided on both outer sides of said pair of filtration membranes.

7. A plate-type filter cartridge as recited in claim 1, wherein said fibrous material is selected from the group consisting of polyester and polypropylene.

* * * * *